(12) United States Patent
Valembois

(10) Patent No.: US 12,151,825 B2
(45) Date of Patent: Nov. 26, 2024

(54) AIRCRAFT

(71) Applicant: CONSEIL ET TECHNIQUE, Lauzerville (FR)

(72) Inventor: Guy Valembois, Lauzerville (FR)

(73) Assignee: CONSEIL ET TECHNIQUE, Sainte Foy d'Aigrefeuille (FR)

( * ) Notice: Subject to any disclaimer, the term of this patent is extended or adjusted under 35 U.S.C. 154(b) by 170 days.

(21) Appl. No.: 17/632,773

(22) PCT Filed: Aug. 3, 2020

(86) PCT No.: PCT/EP2020/071810
§ 371 (c)(1),
(2) Date: Feb. 3, 2022

(87) PCT Pub. No.: WO2021/023712
PCT Pub. Date: Feb. 11, 2021

(65) Prior Publication Data
US 2022/0258868 A1  Aug. 18, 2022

(30) Foreign Application Priority Data

Aug. 5, 2019 (FR) ........................... 1908985

(51) Int. Cl.
| | |
|---|---|
| *B64D 27/24* | (2024.01) |
| *B64C 1/16* | (2006.01) |
| *B64C 11/00* | (2006.01) |
| *B64C 11/48* | (2006.01) |
| *B64D 41/00* | (2006.01) |

(52) U.S. Cl.
CPC ................ *B64D 27/24* (2013.01); *B64C 1/16* (2013.01); *B64C 11/001* (2013.01); *B64C 11/48* (2013.01); *B64D 2041/002* (2013.01)

(58) Field of Classification Search
CPC . B64C 11/001; B64C 11/48; B64D 2041/002; B64D 29/04; B64D 27/12
USPC ........................................................ 244/55
See application file for complete search history.

(56) References Cited

U.S. PATENT DOCUMENTS

| | | | |
|---|---|---|---|
| 10,358,228 B2* | 7/2019 | Marrinan ............... | B64D 33/02 |
| 10,538,335 B2* | 1/2020 | Conti ...................... | B64C 21/06 |
| 11,299,283 B2* | 4/2022 | Ramakrishnan ....... | B64D 27/14 |
| 11,814,152 B2* | 11/2023 | Princen .................. | B64D 27/24 |
| 2017/0025938 A1* | 1/2017 | Ishak ..................... | H02K 99/20 |

(Continued)

FOREIGN PATENT DOCUMENTS

| | | | | |
|---|---|---|---|---|
| CA | 3064700 A1 * | 6/2020 | .............. | B64C 3/10 |
| CH | 235 699 A | 12/1944 | | |
| CN | 109502024 A | 3/2019 | | |

(Continued)

*Primary Examiner* — Christopher P Ellis
(74) *Attorney, Agent, or Firm* — Craft Chu PLLC; Andrew W. Chu

(57) ABSTRACT

An aircraft includes a fuselage, a wing structure and a tail assembly, and also at least one propeller having the general shape of a ring. The propeller includes a rotor formed by an annular element having blades projecting outwardly therefrom, and a likewise annular base coaxial to the annular element and on which the annular element can turn under the action of a driver. The base is coaxial to the fuselage and integrated into the shell constituting the fuselage. The blades of the rotor are arranged outside the shell.

6 Claims, 2 Drawing Sheets

(56) References Cited

U.S. PATENT DOCUMENTS

2022/0017207 A1* 1/2022 Princen .................. B64C 21/08

FOREIGN PATENT DOCUMENTS

| | | | | |
|---|---|---|---|---|
| DE | 18 84 174 U | 12/1963 | | |
| DE | 44 39 791 A1 | 5/1996 | | |
| DE | 102013015364 A1 * | 3/2015 | ............... | B64C 1/16 |
| DE | 102018208297 A1 * | 11/2019 | | |
| DE | 112014000391 B4 * | 6/2021 | ............... | B64C 1/16 |
| EP | 3093235 A1 * | 11/2016 | ........... | B64C 11/001 |
| FR | 3043984 A1 * | 5/2017 | ............... | B64C 1/40 |
| GB | 2365830 A | 2/2002 | | |
| RU | 2660094 C1 * | 7/2018 | ............... | B60L 50/50 |
| WO | 2014108125 A | 7/2014 | | |
| WO | 2014166811 A2 | 10/2014 | | |

\* cited by examiner

AIRCRAFT

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to an aircraft.

2. Description of Related Art Including Information Disclosed Under 37 CFR 1.97 and 37 CFR 1.98

Current aircraft are equipped with reactors, and the propulsion is mainly generated by the fan of said reactors. The airflow is channeled by an external shroud which cooperates with the large diameter of the blades of the fan.

At the time of the first oil crisis, in order to reduce fuel consumption, engines referred to as "propfan" were envisaged, which use very large-diameter fans and generally have two contra-rotating stages, but which did not have an external shroud because their dimensions were such that this would have been difficult to integrate.

Currently, with the same aim of saving fuel, because this design would allow for a potential saving of 20 to 25% in terms of energy consumption, it is intended to equip airliners with such engines.

However, a project of this kind has a number of disadvantages. Thus, on account of the very large diameter of the fans, it is necessary to rethink the architecture of the airplanes, which leads to very significant costs. Indeed, it is not possible to position such engines under the wings, and it is generally intended to install them above the wing structures, in particular above the tail assembly.

Moreover, the design makes use of the traditional power system mode of turbojet engines, which does not allow for development towards new energy modes, in particular electric and hybrid.

Another disadvantage of said "propfan" engines will be noted, i.e. the increased noise that they generate on account of the absence of a shroud. Even if this disadvantage has been resolved in part by using blades having a particular profile, it has not been entirely eliminated.

The aim of the present invention is that of proposing an aircraft which makes it possible to resolve all the disadvantages cited above.

BRIEF SUMMARY OF THE INVENTION

The present invention in particular aims not only to achieve fuel savings and to make it possible to retain the current architecture of the aircraft, but also to make it possible to envisage an electric or hybrid power system.

The aircraft according to the invention comprises a fuselage, a wing structure, and a tail assembly, and is characterized in that it further comprises at least one propeller having the general shape of a ring and comprising, on the one hand, a rotor formed by an annular element having blades projecting outwardly therefrom, and, on the other hand, a likewise annular base which is coaxial with respect to the annular element and on which said annular element can turn under the action of drive means, said base being coaxial with respect to said fuselage and being integrated into the shell constituting said fuselage, whereas the blades of said rotor are arranged outside said shell.

It will be understood that the propeller of an aircraft of this kind has the advantages of a large-diameter fan engine, without being of a size that is destructive for the aircraft since the architecture of the aircraft can remain of the conventional type and does not have protuberances on the wing structure which adversely affect good aerodynamic behavior, both for the main wing structure and for the tail assembly.

Furthermore, incorporating the base of the propeller in the shell forming the fuselage frees a space which makes it possible, in addition to not hindering the circulation inside the aircraft, to envisage the use of power systems of all types.

According to an additional feature of the aircraft according to the invention, the propeller further comprises, outside the rotor, a shroud, so as to define, together with the base to which it is rigidly connected by legs, a space in which at least one rotor moves.

The presence of the external shroud makes it possible to confine the aerodynamic flow in order to optimize the performance of the rotor, and it prevents the problems of noise.

According to another additional feature of the aircraft according to the invention, the rotor is provided with means for regulating the angle of attack of the blades.

A feature of this kind makes it possible to optimize the operation of the propeller, according to the speed of the aircraft.

According to an additional feature of the aircraft according to the invention, the propeller comprises two contra-rotating rotors.

The drive means may be of different forms, the aim being to cause the rotor of the propeller to turn. The rotor may for example comprise, on the inside, a ring gear on which a pinion engages which is itself driven by an engine.

According to a particular embodiment of the aircraft according to the invention, the drive means consist in toroidal electric motors of the brushless type, having a fixed winding and a movable peripheral rotor, the stator being incorporated in the fixed base which is incorporated in the shell of the fuselage and comprises coils, while said rotor bears the blades and comprises permanent magnets on the inside.

According to this design, the space inside the propeller is free, such that said propeller may be arranged in any location along the aircraft, without interrupting the cabin.

According to another additional feature of the aircraft according to the invention, the stator comprises a plurality of pairs of poles.

The aircraft according to the invention may be equipped with one or more propellers as defined above.

According to another additional feature of the aircraft according to the invention, the shell which forms the fuselage comprises a space which passes through the propeller, and which is divided horizontally and longitudinally by a floor which defines, at the top, a space intended for transport, and underneath, a space intended to contain the drive means and/or the supply means of said drive means.

BRIEF DESCRIPTION OF THE SEVERAL VIEWS OF THE DRAWINGS

The advantages and the features of the aircraft according to the invention will become clearer from reading the following description, with reference to the accompanying drawings which show a non-limiting embodiment.

In the accompanying drawings.

DETAILED DESCRIPTION OF THE INVENTION

Figure 1:
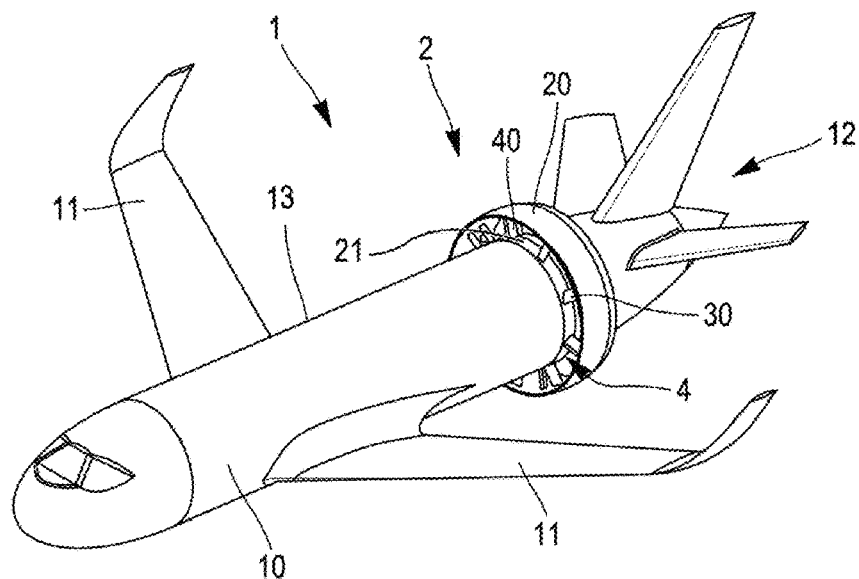
FIG. 1 is a perspective view of an aircraft according to the invention.

With reference to FIG. 1, an aircraft 1 according to the invention is visible, which aircraft is of a conventional general design, i.e. it comprises a fuselage 10 which is equipped, in the mid region thereof, with two wings 11, and at the rear with a tail assembly 12.

The aircraft 1 is provided with a propulsion system made up of a propeller 2 which forms a portion of the shell 13 forming the fuselage 10, inserted between standard portions of said fuselage. The propeller 2 is annular in shape, arranged in part around the fuselage 10, in this case in front of the tail assembly 12 and projecting from the fuselage.

In this embodiment, the propeller 2 comprises two rotors 3 and 4 which are contra-rotating, are provided with blades, 30 and 40, respectively, and which project from the plane defined by the outside wall of the shell 13, in order to move between the fuselage 1 and a shroud 20 which, it will be noted, it is possible to omit.

Figure 2:
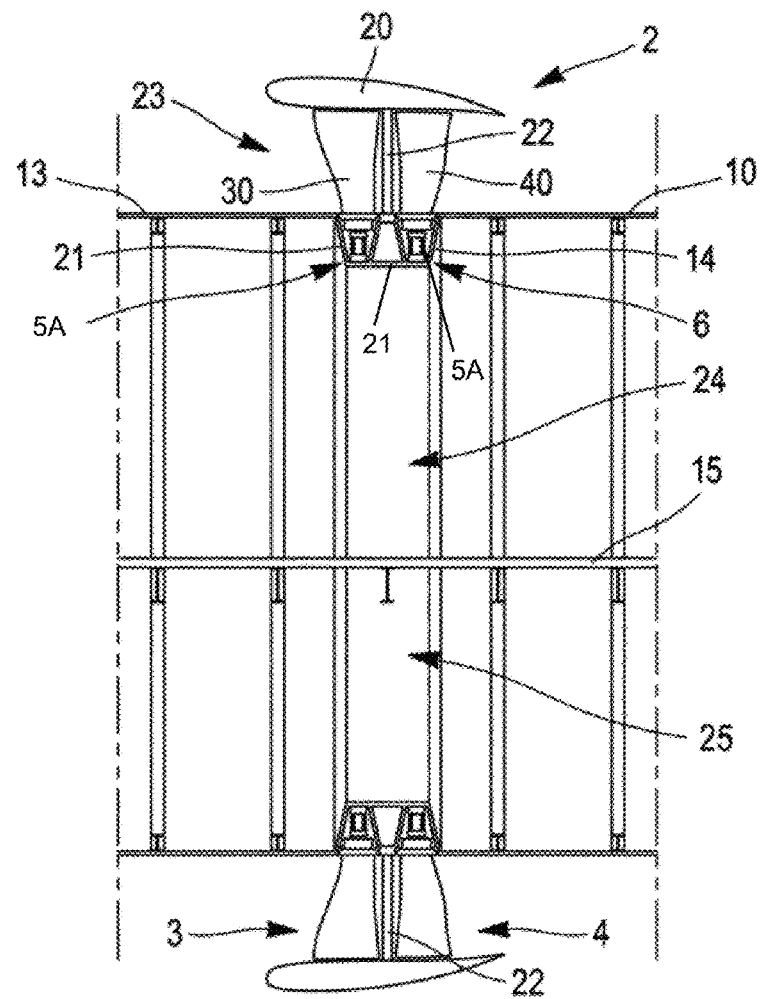
FIG. 2 is a schematic partial cross section according to a longitudinal plane of the same aircraft.

With reference now to FIG. 2, which relates to a particular non-limiting embodiment of the power system of the propeller 2, in this case an electric power system, it is possible to see that said power system is achieved by means of toroidal electric motors of the brushless type, having a fixed winding, and that the propeller 2 is made up of a fixed base 21 which is annular in shape, and a shroud 20 that is rigidly connected, at a distance, to the base 21 by means of legs 22, and two rotors 3 and 4 which move in the annular space 23 delimited by the base 21 and the shroud 20.

It can also be seen that the annular shape of the propeller 2 makes it possible to free up a significant space inside the fuselage 10, which space is divided horizontally and longitudinally by the floor 15 of the shell 13 in order to create, above, a space 24 for transport, and, below, a hold 25 portion which can be intended to house an electric generator of, in a non-limiting manner, the gas turbine or hydrogen battery type, or indeed drive means (not shown) other than electric and intended for driving the propeller 2.

Figure 3:
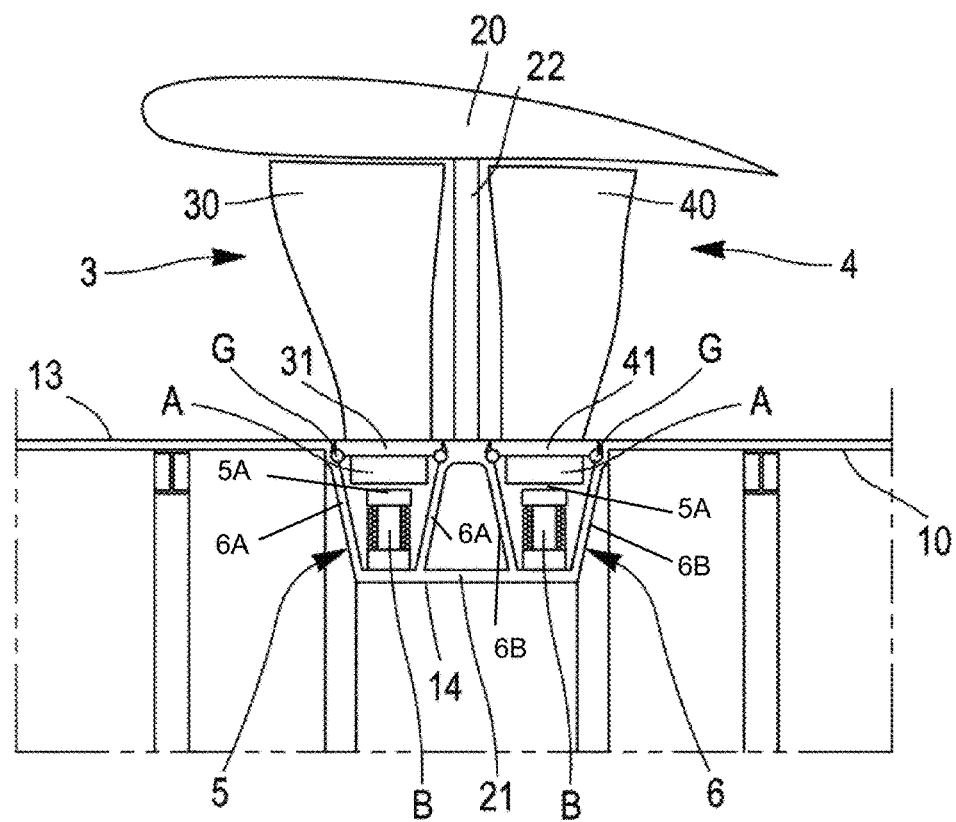
FIG. 3 is a detailed schematic view of FIG. 2.

With reference also to FIG. 3, it can be seen that the base 21 is incorporated into a bearing structure 14 in the form of an annular groove which forms an integral part of the shell 13 and which houses two annular stators 5 and 6, each cooperating with one of the rotors, 3 and 4, respectively.

The stators 5 and 6 comprise coils B which are arranged and distributed peripherally, while each of the rotors 3 and 4 comprises an element in the form of a ring, 31 and 41, respectively, which is mounted on the bearing structure 21 so as to be freely rotatable, by means of rolling or sliding means G, from which the blades 30 and 40 project towards the outside, and which comprises, on the inside, permanent magnets A which are arranged so as to remain at a small distance from the coils B.

The peripheral dimension of the propeller 2 makes it possible for the engine to integrate a large number of poles, which has advantages, in particular a redundancy of the engine or engines which can be easily managed, a positioning and an exchange surface which facilitate natural cooling, it being possible for a quasi linear engine to be formed by parts, each part using an angular sector of the torus in order to create the redundancy.

Figure 4:
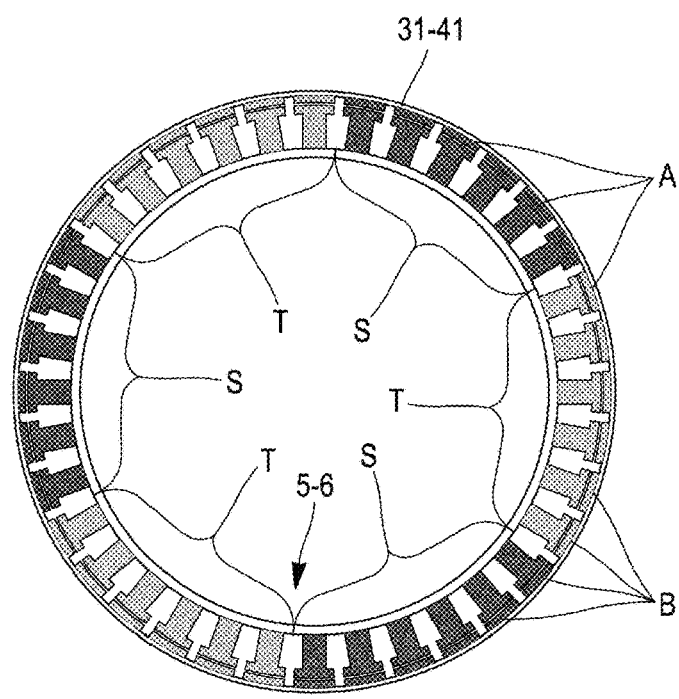
FIG. 4 is a schematic elevated view of a portion of the engine of the aircraft according to the invention.

Thus, with reference to FIG. 4, a portion of a rotor, 3-4, i.e. the element 31-41 and its magnet A, and a portion of a stator, 5-6, i.e. its coils B, are visible. The stator 5-6 comprises an alternating succession of angular sectors S and T creating a succession of poles.

I claim:

1. An aircraft, comprising:
   a fuselage being comprised of a shell;
   a wing structure being fixed to said fuselage;
   a tail assembly being fixed to said fuselage behind said wing structure; and
   a ring propeller being comprised of a rotor, a brushless toroidal electric motor, and an annular base,
   wherein said rotor is comprised of:
   an annular element; and
   blades projecting outwardly from said annular element,
   wherein said annular base is coaxial with said annular element, said rotor being rotatable around said annular base,
   wherein said annular base is made integral with said shell so as to be coaxial with said fuselage and form an interior space within said fuselage,
   wherein said blades are arranged outside said shell, and wherein the motor comprises:
   a stator being comprised of said annular base so as to form said interior space within said motor;
   a coil within said stator; and
   a permanent magnet on an inside of said annular element so as to rotate said blades on said annular element around said stator and said annular base.

2. The aircraft, according to claim 1, wherein the propeller further comprises a shroud and legs connecting said shroud to said annular base so as form an outer space, and wherein said blades of said rotor are movable through said outer space.

3. The aircraft, according to claim 1, wherein said ring propeller is further comprised of an additional rotor,
   wherein said additional rotor is comprised of an additional annular element and additional blades projecting outwardly from said additional annular element, wherein said annular base is coaxial with said additional annular element, said additional rotor being rotatable around said annular base,
wherein said additional blades are arranged outside said shell, and
wherein the motor further comprises:
an additional stator;
an additional coil within said additional stator; and
an additional permanent magnet on an inside of said additional annular element so as to rotate said additional blades on said additional annular element around said additional stator and said annular base.

4. The aircraft, according to claim 1, wherein said stator is further comprised of a plurality of pairs of poles.

5. The aircraft, according to claim 1, wherein the motor is positioned relative to said interior space so as to be connected to a hold portion within said interior space configured to supply electricity by an electricity generator.

6. The aircraft, according to claim 1, wherein said shell is comprised of a floor so as to horizontally and longitudinally divide said interior space.

\* \* \* \* \*